United States Patent
Auer et al.

(10) Patent No.: US 11,981,362 B2
(45) Date of Patent: May 14, 2024

(54) METHOD AND MEASURING VEHICLE FOR DETERMINING AN ACTUAL POSITION OF A TRACK

(71) Applicant: TRACK MACHINES CONNECTED GESELLSCHAFT M.B.H., Linz (AT)

(72) Inventors: Florian Auer, Vienna (AT); David Buchbauer, Steinakirchen am Frost (AT); Martin Bürger, Linz (AT); Bernhard Metzger, Virginia Beach, VA (US); Fabian Hinterberger, Linz (AT)

(73) Assignee: TRACK MACHINES CONNECTED GESELLSCHAFT M.B.H., Linz (AT)

( * ) Notice: Subject to any disclaimer, the term of this patent is extended or adjusted under 35 U.S.C. 154(b) by 312 days.

(21) Appl. No.: 17/638,990

(22) PCT Filed: Jul. 31, 2020

(86) PCT No.: PCT/EP2020/071628
§ 371 (c)(1),
(2) Date: Feb. 28, 2022

(87) PCT Pub. No.: WO2021/037476
PCT Pub. Date: Mar. 4, 2021

(65) Prior Publication Data
US 2022/0266881 A1    Aug. 25, 2022

(30) Foreign Application Priority Data
Aug. 29, 2019  (AT) .................................. A 284/2019

(51) Int. Cl.
*B61L 23/04*    (2006.01)
*B61L 15/00*    (2006.01)
(Continued)

(52) U.S. Cl.
CPC ......... *B61L 23/047* (2013.01); *B61L 15/0081* (2013.01); *B61L 23/042* (2013.01);
(Continued)

(58) Field of Classification Search
CPC .. B61L 15/0081; B61L 23/042; B61L 23/047; B61L 25/025; G06T 2207/10012; G06T 2207/30256
(Continued)

(56) References Cited

U.S. PATENT DOCUMENTS

2004/0122569 A1*  6/2004  Bidaud ............... B61L 15/0058
                                                         701/19
2018/0057029 A1*  3/2018  Maurice .................. B61K 9/08
(Continued)

FOREIGN PATENT DOCUMENTS

AT        518579 A1       11/2017
WO     2019029916 A1       2/2019

OTHER PUBLICATIONS

International Search Report and Written Opinion in International Application No. PCT/EP2020/071628, dated Oct. 15, 2020, 15 pages.

*Primary Examiner* — Erick R Solis
(74) *Attorney, Agent, or Firm* — Liang & Hennessey LLP; Brian Hennessey (57) ABSTRACT

A method for determining an actual geometry of a track by a track inspection vehicle which is movable on the track, wherein reference points positioned in a lateral environment of the track are automatically recorded by a non-contacting recording system arranged on the track inspection vehicle and their respective actual distance from the track is determined. A three-dimensional trajectory of the track is recorded by an inertial measuring system arranged on the track inspection vehicle, wherein the trajectory is divided by (Continued)

a computing unit into trajectory sections each having a section starting point related to a first reference point and a section end point related to a second reference point, wherein a virtual longitudinal chord is defined for each trajectory section in relation to the assigned reference points, and wherein actual distances between the trajectory and the respectively defined longitudinal chord are calculated for each trajectory section.

13 Claims, 4 Drawing Sheets

(51) Int. Cl.
| | |
|---|---|
| B61L 25/02 | (2006.01) |
| G06T 7/00 | (2017.01) |
| G06T 7/60 | (2017.01) |
| G06V 20/10 | (2022.01) |
| G06V 20/56 | (2022.01) |

(52) U.S. Cl.
CPC .......... B61L 25/025 (2013.01); G06T 7/0006 (2013.01); G06T 7/60 (2013.01); G06V 20/176 (2022.01); G06V 20/182 (2022.01); G06V 20/56 (2022.01); B61L 2205/04 (2013.01); G06T 2207/10012 (2013.01); G06T 2207/30252 (2013.01)

(58) Field of Classification Search
USPC .......................................................... 701/19
See application file for complete search history.

(56) References Cited

U.S. PATENT DOCUMENTS

| | | | |
|---|---|---|---|
| 2018/0339720 A1* | 11/2018 | Singh | G06T 7/001 |
| 2020/0158656 A1* | 5/2020 | Chung | B61L 23/047 |
| 2023/0365170 A1* | 11/2023 | Auer | G01C 7/04 |

* cited by examiner

METHOD AND MEASURING VEHICLE FOR DETERMINING AN ACTUAL POSITION OF A TRACK

CROSS-REFERENCE TO RELATED APPLICATIONS

The present application is a national phase application of PCT Application No. PCT/EP2020/071628, filed Jul. 31, 2020, entitled "METHOD AND MEASURING VEHICLE FOR DETERMINING AN ACTUAL POSITION OF A TRACK", which claims the benefit of Austrian Patent Application No. A 284/2019, filed Aug. 29, 2019, each of which is incorporated by reference in its entirety.

BACKGROUND OF THE INVENTION

1. Field of the Invention

The invention relates to a method for determining an actual track geometry by means of a track inspection vehicle movable on the track, wherein reference points positioned in a lateral environment of the track are automatically recorded by means of a non-contacting recording system arranged on the track inspection vehicle and their respective actual distance to the track is determined. The invention further relates to a track inspection vehicle for carrying out the method.

2. Description of the Related Art

In case of a ballasted track, the position of a track panel in the ballast bed is affected by traffic and climatic influences. A specifically designed track inspection vehicle is used to take regular measurements to evaluate the current actual track geometry, especially prior to maintenance work. A suitably equipped on-track machine can also be used as a track inspection vehicle.

In conventional measuring methods, reference points located next to the track are used, that are attached to fixed structures such as electric poles. Such reference points are also called fixed points. Usually, a reference point is defined as the tip of a marking bolt. The intended position of each reference point in relation to the track is documented in lists. This determines a target track geometry, especially for circular and transition curves as well as gradient changes. Intermediate reference points are often placed between main reference points.

AT 518579 A1 describes a method and a track inspection vehicle for automatically recording reference points and determining their position. For this purpose, a stereo camera system is provided, which continuously records image pairs of the track's lateral environment. By means of pattern recognition, an evaluation device determines whether a reference point is depicted in one of the image pairs. In a further step, the position of a detected reference point is determined by evaluating the disparity. In addition, an inertial measuring unit is provided to continuously determine the position of the track inspection vehicle.

SUMMARY OF THE INVENTION

The object of the invention is to improve the above-mentioned method so that required track geometry corrections can be determined in a simple manner. In addition, a track inspection vehicle is to be indicated to carry out the improved method.

According to the invention, these objects are achieved by the features of the independent claims. Dependent claims indicate advantageous embodiments of the invention.

Hereby, a three-dimensional trajectory of the track is recorded by means of an inertial measuring system arranged on the track inspection vehicle, wherein the trajectory is subdivided by means of a computing unit into trajectory sections, each with a section starting point related to a first reference point and a section end point related to a second reference point, wherein a virtual longitudinal chord is established for each trajectory section in relation to the associated reference points and wherein actual distances between the trajectory and the respectively defined longitudinal chord are calculated for each trajectory section. In this way, an automated reference point determination and a trajectory recording of the track are advantageously combined.

The trajectory represents the course of the track centerline or the course of a gauge face of a rail. The determined actual distances of the trajectory sections to the respective longitudinal chord allow a simple evaluation of track geometry defects. For example, relative track geometry defects are evaluated by comparing them with a predefined geometry (e.g. straight section, circular curve, transition curve) of the course of the track. In a preferred variant, a comparison is performed with a predefined target track geometry. In any case, the method allows an accurate correction of the track geometry compared to the recorded reference points. The actual distances are considered "versines" which are usually used in track construction to determine and, in particular, predefine the curvature of the track.

A further simplification of the evaluation of track geometry defects is achieved if the actual distances are calculated in a local coordinate system assigned to the respective longitudinal chord. For this purpose, the corresponding trajectory section is also transformed into this local coordinate system. Favorably, the origin of the local coordinate system is located at a zero point of the longitudinal chord, with an axis of the coordinate system pointing in the direction of the longitudinal chord. In this way, the actual distances to the trajectory section result as vectors in the local coordinate system.

Advantageously, a horizontal vector and a vertical vector are calculated for the actual distances. Values for the levelling of the track can be derived directly from the vertical vectors of the actual distances. The horizontal vectors of the actual distances form a database for lateral lining of the track.

A further improvement of the method is characterised in that a target course of the track is predefined, that the actual distances are compared with assigned target distances between the target course and the respective longitudinal chord, and that correction values for a subsequent track maintenance are derived therefrom. These correction values are subsequently available to be used for controlling an on-track machine to bring the track into the predefined target geometry.

In this process, it is favorable if a horizontal target distance and/or a vertical target distance of the track is predefined in relation to the respective reference point, wherein the correction values are compared with a difference between the recorded actual distance and the assigned target distance. In this way, modified correction values are available to bring the track into a referenced target geometry.

To increase accuracy and to simplify subsequent track geometry correction, a separate three-dimensional trajectory is recorded for each of a left rail of the track and a right rail of the track. This results in individual actual distances for each rail in relation to the respective longitudinal chord, from which rail-dependent specifications for a track geometry correction are derived. Particularly superelevation errors of the track or individual errors with different settlements of the respective rail can be easily recorded in this way.

A further improvement of the method provides that GNSS positions of the track inspection vehicle are recorded by means of a GNSS receiving device, and that the recorded actual position of the track is compared with the GNSS positions. The GNSS positions are used to determine a georeferenced track geometry, which allows the obtained data to be used in higher-level systems without further transformation.

For efficient processing of the measuring results, it is advantageous if a time stamp is predefined as a common time base for each measurement date by means of the inertial measuring system. In this way, the measuring results of the inertial measuring system, the non-contacting reference point recording system and, if applicable, the GNSS receiving device can be easily combined.

In a further realisation of the method, geometric relationships of the arrangements of the inertial measuring system and the non-contacting reference point recording system and, if applicable, a GNSS receiving device are determined by means of a calibration process. This is particularly useful if the two systems are not rigidly arranged on a common measuring platform.

The track inspection vehicle according to the invention comprises a vehicle frame which is movable on a track on rail-based running gears, wherein a non-contacting recording system for the automatic recording of reference points positioned in a lateral environment of the track as well as an inertial measuring unit are arranged on the track inspection vehicle. An inertial measuring system comprising the inertial measuring unit is designed for recording a three-dimensional trajectory of the track, wherein the non-contacting recording system and the inertial measuring system are coupled to a computing unit, and wherein the computing unit is designed to divide the trajectory into trajectory sections each having a section starting point related to a first reference point and a section end point related to a second reference point, to define a virtual longitudinal chord for each trajectory section in relation to the associated reference points, and to calculate actual distances between the trajectory and the respectively defined longitudinal chord for each trajectory section.

This indicates a vehicle with which the described method can be carried out in a simple manner Specifically, the reference points and the trajectory of the track are first automatically recorded and stored by the track inspection vehicle during a measuring run. The computing unit accesses this reference point-related track geometry data to subdivide the trajectory, define respective longitudinal chords and calculate the distances between the trajectory sections and the associated longitudinal chord.

In this context, it is advantageous if the non-contacting recording system comprises a stereo camera system for recording image pairs of the lateral environment of the track and an evaluation device for recording and determining the positions of the reference points. Such a system provides very accurate results and has low error potential.

In a further development, a GNSS receiving device is connected to the vehicle frame, wherein position measuring devices are arranged on the vehicle frame to determine the position of the vehicle frame in relation to the track. By means of the position measuring devices, any relative movement of the vehicle frame to the track is recorded. Continuous computational compensation of these relative movements results in precise GNSS positions of the track inspection vehicle with an accurate reference to the track geometry. As a result, stored GNSS position data is available, which is subsequently compared with the recorded reference point-related track geometry data by means of the computing unit.

BRIEF DESCRIPTION OF THE DRAWINGS

In the following, the invention is explained by way of example with reference to the enclosed figures. The following figures show in schematic illustrations.

DETAILED DESCRIPTION

Figure 1:
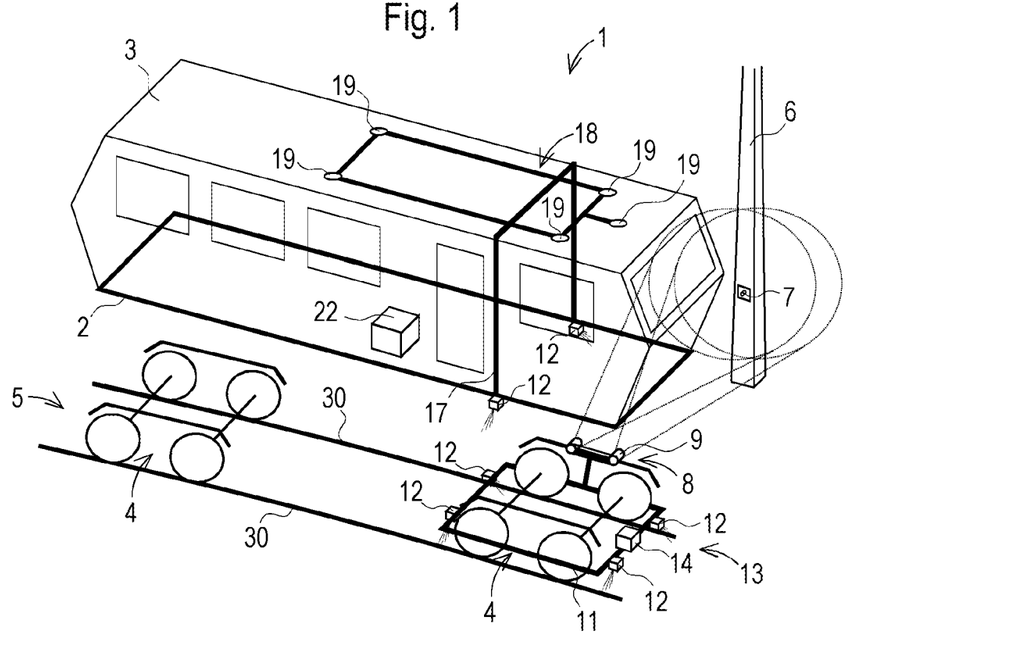
FIG. 1 Track inspection vehicle on a track next to a reference point

FIG. 1 shows a track inspection vehicle 1 with a vehicle frame 2 on which a vehicle body 3 is mounted. The track inspection vehicle 1 is movable on a track 5 by means of rail-based running gears 4. For better illustration, the vehicle frame 2 together with the vehicle body 3 is shown in a raised position from the rail-based running gears 4. A mast 6 with a marking bolt 7 is located in a lateral environment of track 5. The tip of the marking bolt 7 defines a reference point A, B, C for determining the geometry of the track 5. Other marking objects can also define a reference point A, B, C, for example a marker with printed lines or colored areas. In addition, unique identifiers such as a barcode or a letter-number sequence can characterize the reference point A, B, C.

The rail-based running gears 4 are preferably designed as trucks. A non-contacting recording system 8 is arranged on the front truck for the automated recording of the respective reference point A, B, C. During a measuring run, image pairs are continuously recorded by means of a stereo camera system 9 and evaluated by means of an evaluation device 10. As soon as a marking bolt 7 or another reference point marker is recognised in one of the image pairs by means of pattern recognition, the position of the corresponding reference point A, B, C is determined. For example, actual distances H, V of the respective reference point A, B, C to the track 5 are determined in horizontal and vertical direction, while the respective positions in longitudinal track direction s are also recorded.

Favorably, the recording system 8 is arranged on a measuring frame 11. The measuring frame 11 is connected to the wheel axles of the truck so that any movement of the wheels is transmitted to the measuring frame 11 without spring action. Thus, there is only lateral or reciprocal movement of the measuring frame 11 in relation to the track. These movements are recorded by means of position measuring devices 12 arranged on the measuring frame 11. They are designed, for example, as light section sensors.

In addition to determining the position of the recording system 8 in relation to the track 5, these position measuring devices 12 also serve as components of an inertial measuring system 13 mounted on the measuring frame 11. The inertial measuring system 13 comprises an inertial measuring unit 14 as a central element. A trajectory 15 of the track 5 is recorded with the inertial measuring unit 14 during a measuring run, wherein relative movements of the inertial measuring unit 14 in relation to the track are compensated for by means of the data from the position measuring devices 12. In addition, the inertial measuring system 13 comprises a navigation processor 16 which outputs a trajectory 15 of the track 5 corrected for subsequent evaluation.

A support 17 of a GNSS receiving device 18 is rigidly connected to the vehicle frame 2. The GNSS receiving device 18 comprises several GNSS antennas 19 aligned with each other for accurate recording of GNSS positions 20 of the track inspection vehicle 1. In order to record the reciprocal movements of the vehicle frame 2 relative to the track 5, further position measuring devices 12 are arranged on the vehicle frame 2. Again in this case, light section sensors are used. A system processor 21 is used to jointly evaluate the signals received from the GNSS antennas 19 and to compensate for the relative movements in relation to the track 5.

It is useful to calibrate the geometric relationships of the measuring systems 8, 13, 18 prior to a measuring run. Thereby, the position and orientation of the reference point recording system 8 and the GNSS antennas 19 in relation to the measuring frame 11 of the truck are determined. The position and orientation of the inertial measuring unit 14 are known through the construction of the measuring frame 11. The result of the calibration is a displacement and rotation of the reference point recording system 8 in relation to the inertial measuring unit 14.

Figure 2:
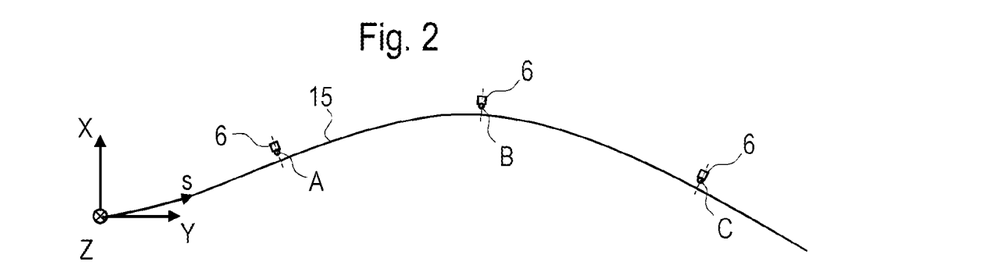
FIG. 2 Trajectory of a track

FIG. 2 shows the trajectory 15 of track 5 recorded during a measuring run. The coordinates of the trajectory 15 are transferred into a local horizon coordinate system XYZ by means of a computing unit 22 arranged in the track inspection vehicle 1. The origin of this coordinate system XYZ is the starting point of the trajectory 15. The X-axis points north, the Y-axis points east, and the Z-axis points downwards. By means of the reference point recording system 8, the reference points A, B, C located along the measuring section are also recorded. In this way, a reference point-related track geometry of the measuring section is recorded and stored in a memory unit coupled to the computing unit 22.

Figure 3:
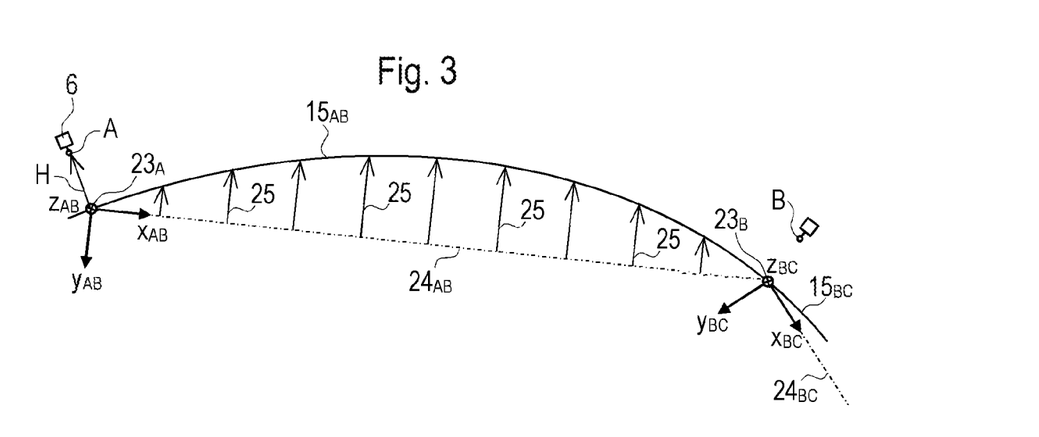
FIG. 3 Top view of trajectory sections with associated longitudinal chords and actual distances FIG. 4 Detailed view of FIG. 3

In the next step of the method, the recorded and stored trajectory 15 is divided into trajectory sections $15_{AB}$, $15_{BC}$ by means of the computing unit 22, as shown in FIG. 3. A respective section starting point is related to a first reference point A or B and a respective section end point is related to a second reference point B or C. For example, the section starting point and the section end point are defined in a reference plane oriented perpendicular to the trajectory 15, in which the assigned reference point A, B, C is located. Favorably, these reference planes also contain track connection points $23_{AB}$, $23_{BC}$, which determine a referenced target geometry 27' of the track 5 in relation to the reference points A, B, C.

In addition, a virtual longitudinal chord $24_{AB}$, $24_{BC}$ is determined for each trajectory section $15_{AB}$, $15_{BC}$ by means of the computing unit 22. A starting point of the respective longitudinal chord $24_{AB}$, $24_{BC}$ forms an origin of an assigned local coordinate system $x_{AB}$ $y_{AB}$ $z_{AB}$ or $x_{BC}$ $y_{BC}$ $z_{BC}$. The respective x-axis xAB, xBc is aligned in the direction of the assigned longitudinal chord $24_{AB}$, $24_{BC}$. The respective y-axis $y_{AB}$, $y_{BC}$ runs horizontally and the z-axis $z_{AB}$, $z_{BC}$ points downwards. Advantageously, the starting point of the respective longitudinal chord $24_{AB}$, $24_{BC}$ coincides with the section starting point of the assigned trajectory section 15AB, $15_{BC}$, as shown in FIG. 3.

With this geometric determination, the computing unit 22 continuously or at predetermined intervals calculates actual distances 25 between the trajectory 15 and the respective assigned longitudinal chord $24_{AB}$, $24_{BC}$ for each trajectory section $15_{AB}$, $15_{AB}$. These calculated actual distances 25 are also referred to as versines and form a database for a subsequent calculation of a track geometry correction. In the process, a specification of target distances 26 is made with reference to a target course 27 of the track 5. This target course 27 is initially a sequence of predefined track geometry sections such as straight sections, circular curves, and transition curves. With known target distance values H', V' of the connection points $23_A$, $23_B$ in relation to the reference points A, B, C, the referenced target geometry 27' of the track 5 can also be predefined. Subsequently, it may be useful to determine an absolute track geometry 36 by means of known coordinates $X_A$ $Y_A$ $Z_A$ of the reference points A, B, C.

Figure 4:
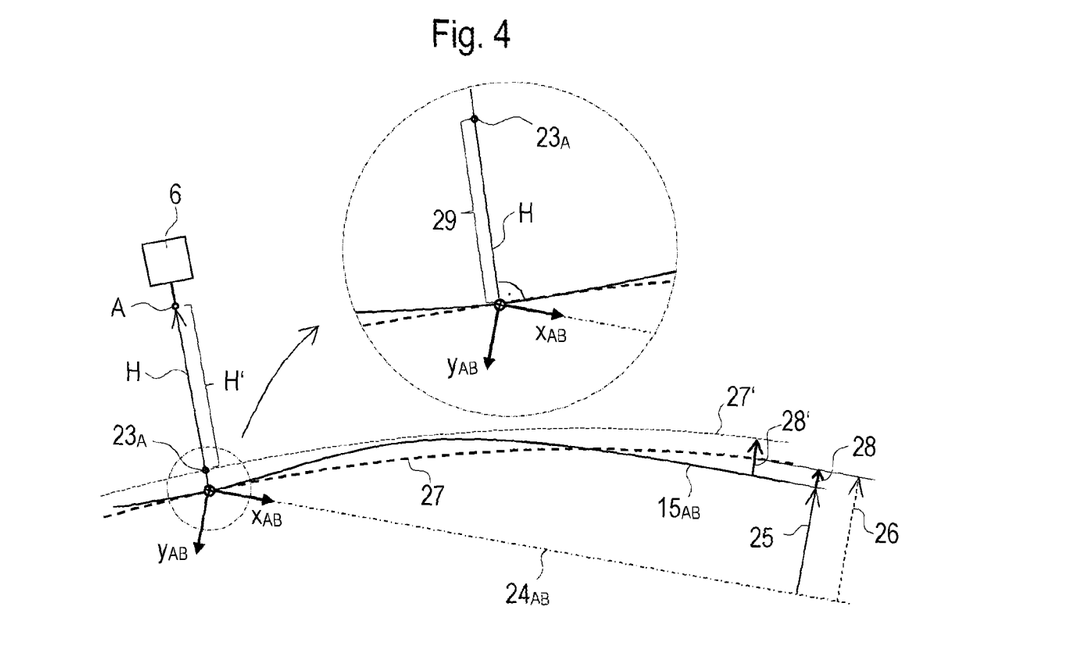
Figure 5:
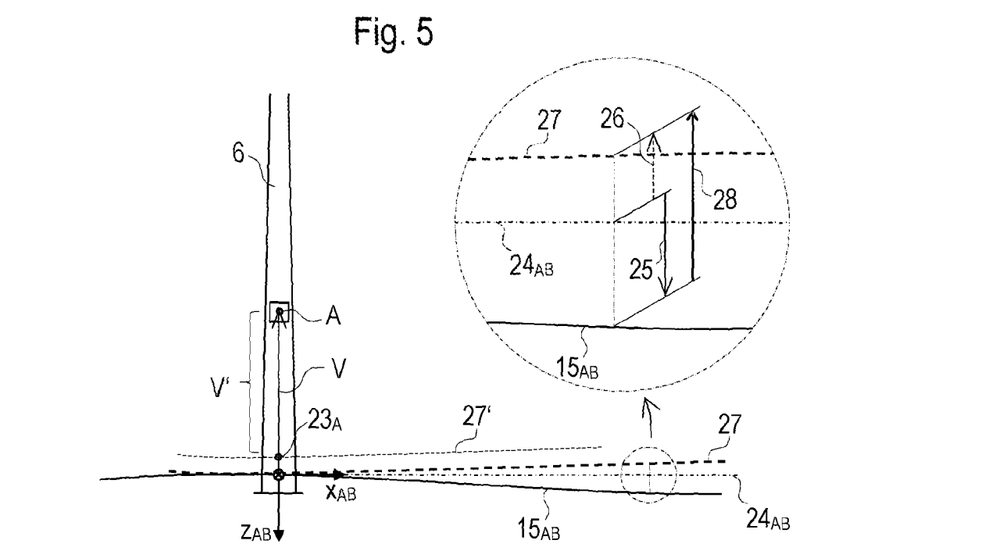
FIG. 5 Side view of a trajectory with associated longitudinal chord

FIGS. 4 and 5 show the geometric relationships in the area of a reference point A in a top view and in a side view. Accordingly, the distances 25, 26 are indicated as horizontal vectors in FIG. 4 and as vertical vectors in FIG. 5. The longitudinal chord $24_{AB}$, the trajectory section $15_{AB}$ and the target course 27 of the track 5 are used to calculate correction values 28. The assigned local coordinate system $x_{AB}$ $y_{AB}$ $z_{AB}$ is used as the reference system.

The actual distance 25 resulting at a respective point of the track 5 is compared with the target distance 26 in order to derive a correction value 28. The correction values 28 can also be derived directly from the actual distances 25 (actual versines) and a predefined track geometry (curvature of the curve). Specifically, this leads to a correction value 28 for the lateral displacement of the track 5 in FIG. 4 and a correction value 28 for the lifting of the track 5 in FIG. 5.

The horizontal target distance H' and the vertical target distance V' between the respective reference point A, B, C and the assigned connection point $23_A$ of track 5 are known from a list of reference points A, B, C (e.g. chainage in the longitudinal track directions). In addition, the actual distances H, V between the actual geometry of the track 5 and the respective reference point A, B, C recorded during a measuring run by means of the non-contacting recording system 8 are known. These actual distances are preferably determined as vectors H, V oriented perpendicular to the course of the track.

Subsequently, a respective difference 29 is formed from the known target distances H', V' and the recorded actual distances H, V. The respective difference 29 is used to adjust the correction values 28 in order to obtain a referenced target geometry 27' of the track 5 in relation to the reference points A, B, C during subsequent track maintenance. For example, the difference 29 between the target distance H', V', and the actual distance H, V relevant to the respective trajectory section $15_{AB}$ is evenly applied to the correction values 28 to obtain modified correction values 28'.

Advantageously, this calculation process is carried out separately for both rails 30 of track 5. The gauge face of the assigned rail 30 is recorded as the respective trajectory 15 and compared with a target geometry of the rail 30.

Figure 6:
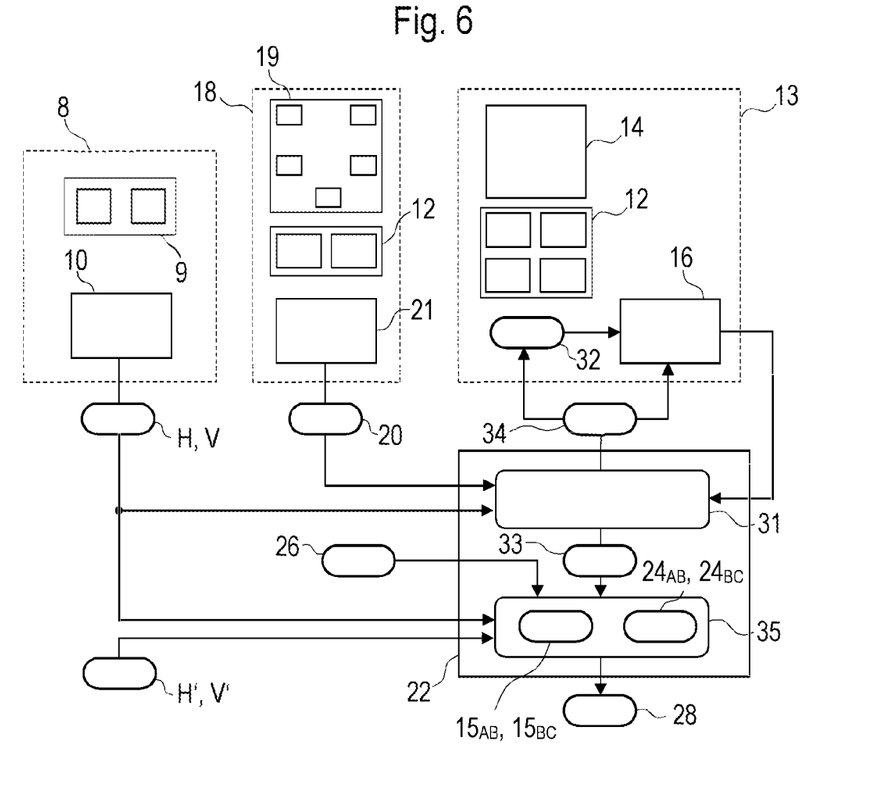
FIG. 6 Block diagram and data processing

An exemplary diagram of the systems involved is shown in FIG. 6. An integration algorithm 31 is provided in the computing unit 22 by means of which the measuring results of the measuring systems 8, 13, 18 are linked. The coordinates of the reference points A, B, C provide the basis for the integration of the referenced track geometry. The integration process also takes the GNSS positions 20 into account, resulting in the trajectory 15 having precise GNSS coordinates (georeferenced track geometry). It must be ensured that all coordinates are related to a common coordinate system XYZ.

The inertial measuring system 13 first determines corrected measuring data 32 of the inertial measuring unit 14. This data is fed into the navigation processor 16 and gives a preliminary trajectory 15. By means of the integration algorithm 31, a relative course 33 of the track 5 (relative track geometry) is calculated from it.

The navigation processor 16 works according to the common principles of inertial navigation and calculates unknown parameters, the respective position, the respective speed, and the respective orientation using a Kalman filter. In addition to determining the unknown parameters, any sensor inaccuracies of the inertial measuring unit 14 are estimated as well. Corresponding correction data 34 is used to correct the measuring results of the inertial measuring unit 14.

An evaluation algorithm 35 divides the trajectory 15 into the trajectory sections 15$_{AB}$, 15$_{BC}$ in relation to the recorded reference points A, B, C and assigns the respective longitudinal chord 24$_{AB}$, 24$_{BC}$. By comparing the calculated actual distances 25 with the target distances 26, the correction values 28 for levelling and lining the track 5 are obtained.

Figure 7:
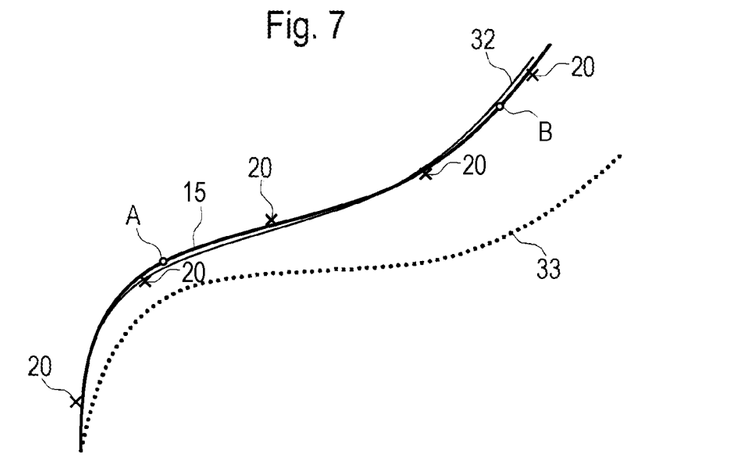
FIG. 7 Recording of a georeferenced trajectory

FIG. 7 shows the results of the measurements, the corrections, and the data links. During a measuring run, the measuring data 32 is first recorded by means of the inertial measuring system 13. In addition, coordinates of the reference points A, B, C and GNSS positions 20 are recorded. The final correct position of the three-dimensional trajectory 15 results from the georeferencing process.

Figure 8:
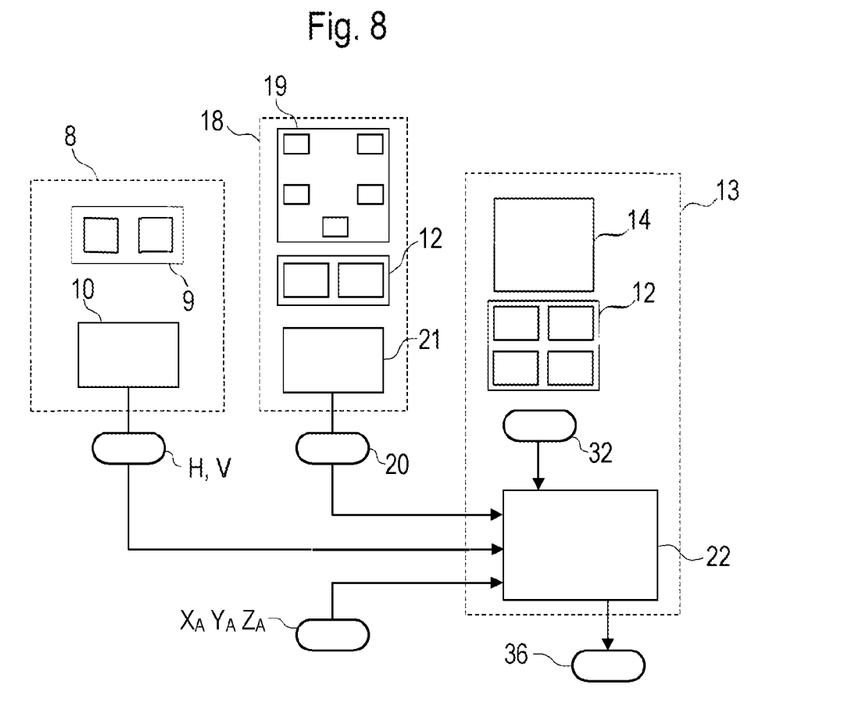
FIG. 8 Block diagram of an alternative evaluation logic

The scheme shown in FIG. 8 is used to determine an absolute track geometry 36. The computing unit 22 compares the measuring results of the individual measuring systems 8, 18, 13 with the coordinates $X_A$ $Y_A$ $Z_A$ of the reference points A, B, C using a Kalman filter.

The invention claimed is:

1. A method for determining an actual geometry of a track by a track inspection vehicle movable on the track, comprising:
  recording automatically, by a non-contacting recording system arranged on the track inspection vehicle, reference points positioned in a lateral environment of the track;
  determining a respective actual distance from the track for the references points;
  recording a three-dimensional trajectory of the track by an inertial measuring system arranged on the track inspection vehicle;
  subdividing, by a computing unit, the three-dimensional trajectory into trajectory sections each trajectory section having a section starting point related to a first reference point and a section end point related to a second reference point;
  defining, for each trajectory section, a virtual longitudinal chord in relation to the assigned reference points; and
  calculating, for each trajectory section, actual distances between the three-dimensional trajectory and the respectively defined virtual longitudinal chord.

2. The method according to claim 1, wherein the actual distances are calculated in a local coordinate system assigned to the respective longitudinal chord.

3. The method according to claim 1, wherein a horizontal vector and a vertical vector are calculated for the actual distances.

4. The method according to claim 1, wherein a target course of the track is predefined, the actual distances are compared with assigned target distances between the target course and the respective longitudinal chord, and correction values for a subsequent track maintenance are derived therefrom.

5. The method according to claim 4, wherein at least one of a horizontal target distance and a vertical target distance of the track is predefined in relation to the respective reference point, and the correction values are compared with a difference between the recorded actual distance and the associated target distance.

6. The method according to claim 1, wherein the three-dimensional trajectory includes a left rail three-dimensional trajectory of the left rail of the track and a right rail three-dimensional trajectory of the track of the right rail of the track.

7. The method according to claim 1, wherein GNSS positions of the track inspection vehicle are recorded by a GNSS receiving device, and the recorded actual geometry of the track is matched with the GNSS positions.

8. The method according to claim 1, wherein a time stamp is predefined as a common time base for each measuring date by means of the inertial measuring system.

9. The method according to claim 1, wherein a first geometric relationship of a first array of the inertial measuring system and the non-contacting recording system is determined by a calibration process.

10. The method according to claim 9, wherein a second geometric relationship of a second array of the inertial measuring system and the non-contacting recording system and a GNSS receiving device is determined by means of the calibration process.

11. A track inspection vehicle having a vehicle frame that is movable on rail-based running gears on a track, comprising:
  a non-contacting recording system for automatically recording reference points positioned in a lateral environment of the track arranged on the track inspection vehicle; and
  an inertial measuring unit arranged on the track inspection vehicle;
  wherein an inertial measuring system comprising the inertial measuring unit is designed to record a three-dimensional trajectory of the track;
  wherein the non-contacting recording system and the inertial measuring system are coupled to a computing unit; and
  wherein the computing unit is designed to divide the trajectory into trajectory sections, each having a section starting point related to a first reference point and a section end point related to a second reference point, to define a virtual longitudinal chord for each trajectory section in relation to the assigned reference points, and to calculate for each trajectory section actual distances between the trajectory and the respectively defined longitudinal chord.

12. The track inspection vehicle according to claim 11, wherein the non-contacting recording system comprises a stereo camera system for recording image pairs of the lateral environment of the track and an evaluation device for recording and determining the position of the reference points.

13. The track inspection vehicle according to claim 11, further comprising:
   a GNSS receiving device connected to the vehicle frame; and
   a plurality of position measuring devices for determining the position of the vehicle frame in relation to the track are arranged on the vehicle frame.

* * * * *